United States Patent [19]
Zernickel et al.

[11] Patent Number: 5,458,422
[45] Date of Patent: Oct. 17, 1995

[54] PLAY-FREE RADIAL BALL BEARING

[75] Inventors: Alexander Zernickel, Herzogenaurach; Horst Scholian, Aurachtal; Horst Doppling, Herzogenaurach, all of Germany

[73] Assignee: Ina Walzlager Schaeffler KG, Germany

[21] Appl. No.: 347,441

[22] Filed: Nov. 30, 1994

[30] Foreign Application Priority Data

Jul. 29, 1992 [DE] Germany .......................... 42 24 992.9

[51] Int. Cl.⁶ .................................................. F16C 33/60
[52] U.S. Cl. ............................................. 384/505; 384/517
[58] Field of Search ...................... 384/499, 505, 384/514, 517, 518

[56] References Cited

U.S. PATENT DOCUMENTS

| | | |
|---|---|---|
| 3,876,266 | 4/1975 | Rozentals . |
| 4,569,602 | 2/1986 | Lundgren ................................ 384/499 |
| 4,718,781 | 1/1988 | Gérard ................................ 384/505 X |
| 4,964,742 | 10/1990 | Kagawa et al. ...................... 384/505 X |

FOREIGN PATENT DOCUMENTS

| | | |
|---|---|---|
| 0439841 | 8/1991 | European Pat. Off. . |
| 0486343 | 5/1992 | European Pat. Off. . |
| 1111621 | 3/1956 | France . |
| 2037377 | 12/1970 | France . |
| 2401536 | 7/1975 | Germany . |

*Primary Examiner*—Thomas R. Hannon
*Attorney, Agent, or Firm*—Bierman and Muserlian

[57] ABSTRACT

In a zero-clearance radial ball bearing, two outer bearing race sections (4, 5) made by non-cutting methods together support an outer race (2) while between it and a concentric inner race (3) run bearing balls (1). Against the first bearing race section (4) bears a sleeve section (7) which circumferentially and axially surrounds the second race section (5). A spring component (10) pressing the two race section (4, 5) together acts between the sleeve section (7) and the second bearing race sections (5) in such a way that the balls (1) run with zero clearance. In order to improve the rigidity of such a radial ball bearing and especially the sleeve section (7), it is proposed that the two axial ends of the sleeve section (7) project axially beyond the balls (1). The sleeve section (7) is folded at its end away from its free end to form a radially internal cylindrical stiffening section (13) arranged concentrically with the sleeve section (7) which extends as far as the center of the balls (1) and on which bears the first bearing race section (4).

6 Claims, 1 Drawing Sheet

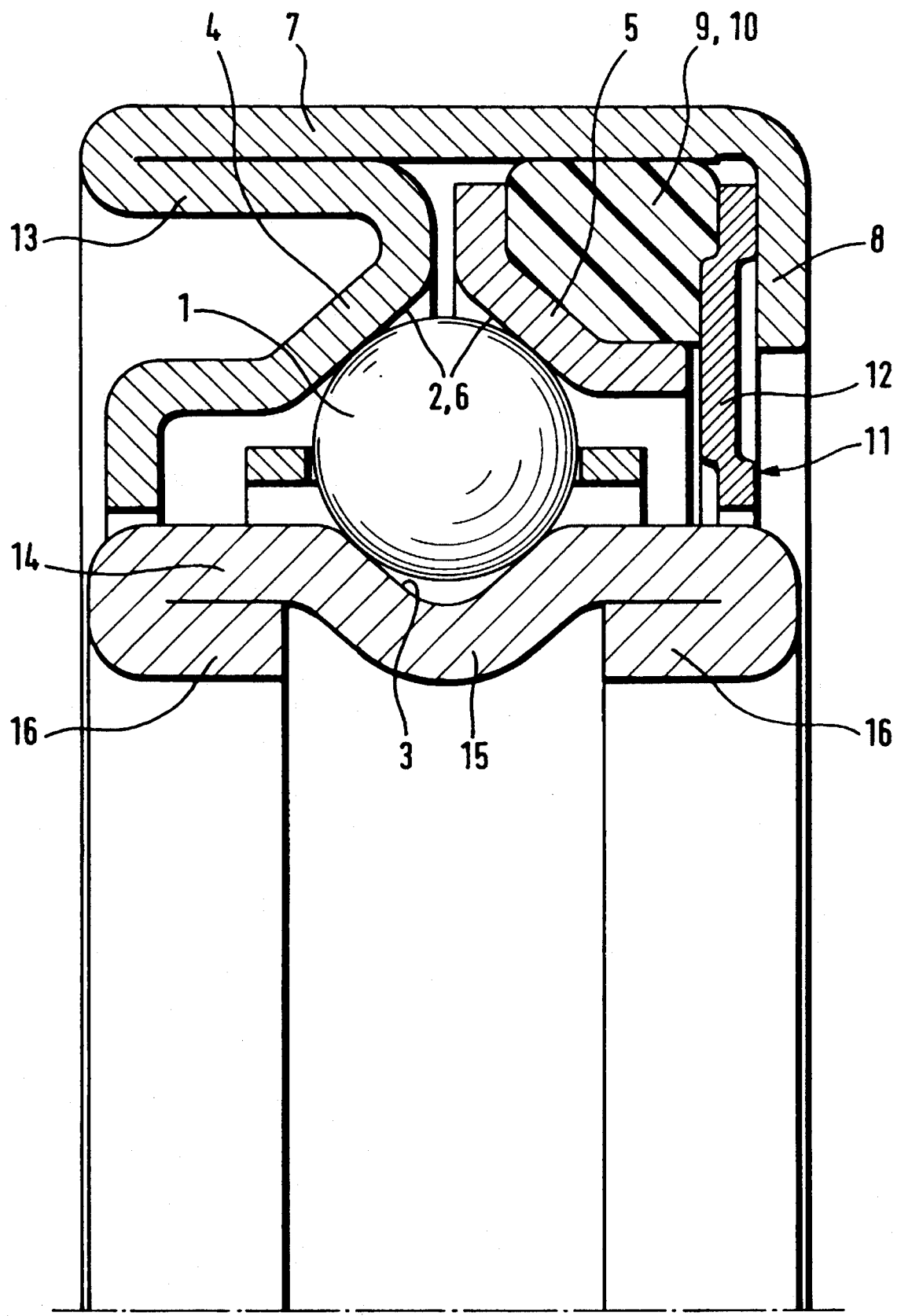

PLAY-FREE RADIAL BALL BEARING

The invention concerns a play-free radial ball bearing comprising a first and a second outer race ring part made by non-cutting methods, the first race ring part comprising a bush portion which surrounds the second race ring part circumferentially and axially, the first and second race ring parts jointly forming an outer raceway, on which outer raceway and a concentric inner raceway, balls roll under pre-tension created by a spring element which acts between the bush portion and the second race ring part and urges the two race ring parts towards each other.

Such a radial ball bearing is known for example from EP-A-03 32 497. High radial loads can lead to undesired deformation if the bush portions are configured with thin walls.

It is an object of the invention to provide a more stable play-free radial ball bearing of the pre-cited type, particularly a more stable bush portion, by simple manufacturing methods without the help of additional means.

The invention achieves this object by the fact that both axial ends of the bush portion extend axially beyond the balls, and an end of the bush portion facing away from a free end thereof is folded to form a radially inner cylindrical stiffening portion which is concentric with the bush portion and extends approximately up to the center of the ball and then merges into the first race ring part.

Undesired deformations are avoided due to the fact that the bush portion is reinforced by the folded stiffening portion. Such a one-piece component comprised of the the first race ring part, the stiffening portion and the bush portion can be made in a simple manner for example by deep-drawing.

Special requirements regarding the axial positioning of the balls within the bush portion can be readily met. The axial dimension of the stiffening portion can be varied so that the two axial ends of the bush portion are equally spaced from the ball center.

Another feature contributing to a simple manufacture of the play-free radial ball bearing of the invention is that the outer raceway is formed on mutually facing flat surfaces of conically shaped race ring parts. The flat surfaces forming the outer raceway can likewise be made in a simple manner by deep-drawing.

The prior art document cited above also discloses a radial flange formed integrally on the free end of the bush portion and an annular disc inserted between this radial flange and the spring element for supporting the spring element. According to the invention, such an annular disc can be stiffened by at least one axial dislocation of a part of its wall thickness over the entire periphery.

For the use of the play-free radial ball bearing of the invention with an inner raceway formed on a cylindrical inner ring, the invention proposes making the inner raceway by forming a circumferential concavity in the inner ring and folding the axial ends of the inner ring to form radially inner stiffening portions concentric with the inner ring. Advantageously, the clear inner diameter of the stiffening portion is, at the utmost, equal to the clear inner diameter of the inner ring in the region of the concavity. When such an inner ring is mounted on a shaft, the stiffening portions bear against the shaft without play. The increase in wall thickness at the axial ends of the inner ring due to the stiffening portions assures the reliable absorption of high pressing-on and pressing-off forces.

The invention will now be described more closely with the help of the sole example of embodiment.

In the play-free radial ball bearing represented in the figure, balls 1 roll on an outer raceway 2 and a concentric inner raceway 3. The outer raceway 2 is formed jointly on a first and a second outer race ring part 4, 5 by mutually facing flat, conical surfaces 6 thereof.

A bush portion 7 is integrally formed on the first outer race ring part 4 and surrounds the second outer race ring part 5 circumferentially and axially while comprising, on its free end, a radially inwards oriented, integrally formed flange 8.

Between the flange 8 and the second outer race ring part 5, there is arranged a spring element 10 in the form of an annular elastomer spring 9 which is supported by means of an annular disc 11 on the flange 8. The elastomer spring 9 is pre-tensioned and urges the second outer race ring part 5 towards the first outer race ring part 4 so that the balls 1 roll under pre-tension on the outer and inner raceways 2 and 3. To increase its rigidity, the annular disc 11 comprises an axial dislocation 12 of a part of its wall thickness over its entire periphery.

At its end facing away from its free end, the bush portion 7 is folded to form a radially inner cylindrical stiffening portion 13 which is concentric with the bush portion 7. To obtain good rigidity, the stiffening portion 13 bears closely against the bush portion 7. This stiffening portion 13 extends axially up to the center of the ball 1 and merges integrally with the first race ring part 4.

The inner ring 14 comprises a concavity 15 forming the inner raceway 3 and this inner ring 14 is folded at its axial ends to form radially inner stiffening portions 16 which are concentric with the inner ring 14. The clear inner diameter of the stiffening portion 16 is, at the utmost, equal to the clear inner diameter of the inner ring 14 in the region of the concavity 15.

The play-free radial ball bearing described here is intended for uses in which assembly conditions require an axial positioning of the balls 1 at the center of the bush portion 7.

The radial ball bearings of the invention can be used for example as steering column bearings in automotive vehicles with the bush portion inserted for instance into a bore of a housing.

We claim:

1. A play-free radial ball bearing comprising a first and a second outer race ring part (4, 5) made by non-cutting methods, the first race ring part (4) comprising a bush portion (7) which surrounds the second race ring part (5) circumferentially and axially, the first and second outer race ring parts (4, 5) jointly forming an outer raceway (2), on which outer raceway (2) and a concentric inner raceway (3), balls (1) roll under pre-tension created by a spring element (10) which acts between the bush portion (7) and the second race ring part (5) and urges the two outer race ring parts (4, 5) towards each other, characterized in that both axial ends of the bush portion (7) extend axially beyond the balls (1), and an end of the bush portion (7) facing away from a free end thereof is folded to form a radially inner cylindrical stiffening portion (13) which is concentric with the bush portion (7) and extends approximately up to a ball center and then merges into the first race ring part (4).

2. A play-free radial ball bearing of claim 1 wherein both axial ends of the bush portion (7) are equally spaced from the ball center.

3. A play-free radial ball bearing of claim 1 wherein the outer raceway (2) is formed on mutually facing flat surfaces (6) of conically shaped race ring parts (4, 5).

4. A play-free radial ball bearing of claim 1 wherein a radial flange (8) is formed integrally on the free end of the bush portion (7) and an annular disc (11) is inserted between this radial flange (8) and the spring dement (10) for supporting the spring element (10), characterized in that the disc (11) comprises at least one axial dislocation (12) of a part of its wall thickness over its entire periphery.

5. A play-free radial ball bearing of claim 1 wherein the inner raceway (3) is formed on a cylindrical inner ring (14) by a circumferential concavity (15) of the inner ring (14), and both axial ends of the inner ring (14) are folded to form radially inner stiffening portions (16) which are concentric with the inner ring (14).

6. A play-free radial ball bearing of claim 5 wherein a clear inner diameter of the stiffening portion (16) is, at the utmost, equal to a clear inner diameter of the inner ring (14) in a region of the concavity (15).

\* \* \* \* \*